(12) United States Patent
Webb et al.

(10) Patent No.: US 6,618,508 B1
(45) Date of Patent: Sep. 9, 2003

(54) MOTION COMPENSATION DEVICE

(75) Inventors: Richard W. Webb, Cupertino, CA (US); James T. Battle, San Jose, CA (US); Chad E. Fogg, Sunnyvale, CA (US); Haitao Guo, Mountain View, CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/350,778

(22) Filed: Jul. 9, 1999

(51) Int. Cl.[7] .............................................. G06K 9/36
(52) U.S. Cl. ...................... 382/238; 382/232; 382/236
(58) Field of Search ................................ 382/236, 238, 382/232, 100, 226; 348/560, 569, 717, 589; 345/602

(56) References Cited

U.S. PATENT DOCUMENTS

| | | | | |
|---|---|---|---|---|
| 4,550,431 A | * | 10/1985 | Werth et al. ................ 382/100 |
| 4,598,282 A | * | 7/1986 | Pugsley ....................... 340/703 |
| 4,740,832 A | * | 4/1988 | Sprague et al. ............ 358/21 R |
| 5,489,947 A | * | 2/1996 | Cooper ........................ 348/589 |
| 5,534,942 A | * | 7/1996 | Beyers, Jr. et al. ......... 348/569 |
| 5,594,813 A | * | 1/1997 | Fandrianto et al. ......... 382/236 |
| 5,737,022 A | * | 4/1998 | Yamaguchi et al. ........ 348/416 |
| 5,754,234 A | * | 5/1998 | Kitsuki et al. .............. 348/394 |
| 5,784,175 A | * | 7/1998 | Lee ............................. 358/433 |
| 5,901,248 A | * | 5/1999 | Fandrianto et al. ......... 382/236 |
| 6,167,086 A | * | 12/2000 | Yu et al. ................. 375/240.03 |
| 6,172,714 B1 | * | 1/2001 | Ulichney .................... 348/560 |

* cited by examiner

Primary Examiner—Anh Hong Do
(74) Attorney, Agent, or Firm—Vedder, Price, Kaufman & Kammholz

(57) ABSTRACT

A computer system that performs motion compensation pixels, the computer system includes a storage device; a memory unit that loads at least one error correction value and at least one reference component into the storage device; and a calculation unit coupled to receive the at least one reference component and the at least one error correction value from the storage device. The calculation unit determines multiple predicted components in parallel and stores the multiple predicted components into the storage device. The arrangement, i.e., field or frame type, of the at least one reference component can differ from the arrangement of the stored multiple predicted components.

20 Claims, 11 Drawing Sheets

| INSTRUCTION | PARAMETER LIST |
|---|---|
| load_ref | <ref_mem_addr><br><ref_addr><br><size><br><width><br><interleaving> |
| load_error | <err_mem_addr><br><err_addr><br><blocks> |
| predict | <ref_pending><br><err_pending><br><FwdRefAddr><br><BwdRefAddr><br><chroma><br><rows><br><width><br><BidirFrac><br><err_addr><br><p_blocks><br><err_interleave><br><result_addr><br><result_interleave> |
| store | <store_mem_addr><br><result_addr><br><store_rows> |

| $R_0$ | $B_0$ | $R_1$ | $B_1$ | $R_2$ | $B_2$ | ... | $R_{15}$ | $B_{15}$ |
|---|---|---|---|---|---|---|---|---|
| $R_{16}$ | $B_{16}$ | $R_{17}$ | $B_{17}$ | $R_{18}$ | $B_{18}$ | ... | $R_{31}$ | $B_{31}$ |

FIG. 9

MOTION COMPENSATION DEVICE

BACKGROUND OF THE INVENTION

1. Field of the Invention

The present invention relates to video decoding. More particularly, the present invention relates to a method and apparatus for applying motion compensation to video decoding.

2. Discussion of Related Art

The Motion Picture Experts Group (MPEG) has promulgated two encoding standards for full-motion digital video and audio, popularly referred to as "MPEG-1" and "MPEG-2", which provide efficient data compression. To simplify the description, where the description is applicable to the MPEG-1 and MPEG-2 standards, the term "MPEG" will be used. MPEG encoding techniques can be used in digital video such as high definition television (HDTV). A publication describing MPEG-1 and MPEG-2 encoding and decoding techniques, Mitchell, J., Pennebaker, W., Fogg, C., and LeGall, D., *MPEG Video Compression Standard*, Chapman and Hall, New York, N.Y. (1996), is incorporated herein by reference.

In MPEG, a predicted image can be represented with respect to no other, one, or more reference image(s). Hereafter when the term "image" is used what is meant is a macroblock representation of the image defined in MPEG. Predicted images may be intracoded or interceded. Intracoded images are defined with respect no other reference images. Intercoded predicted images in so called "average mode operation" are defined with respect to a reference image that is to be displayed earlier in time (forward reference image) and a reference image that is to be displayed later in time (backward reference image). In average mode operation, a predicted image has two associated motion vectors in the x and y direction that indicate the locations of forward and backwards reference images relative to the reference image. Each of the two motion vectors indicates a pixel offset to the forward and backwards reference images within a frame.

MPEG-2 defines an average mode operation called "dual prime". In dual prime average mode, a predicted image has two associated motion vectors in the x and y direction that indicate the locations of forward and backwards reference images relative to the reference image. Forward and backwards reference images are either even or odd fields. Herein the term "average mode" includes "dual prime".

FIG. 1 depicts reference frame 100 that includes predicted image 102 with motion compensation vectors 104 and 106 that point to locations of respective forward reference image 108 and backwards reference image 110. Forward reference image 108 is located among a forward frame 103, displayed earlier in time than reference frame 102. Backwards reference image 110 is located among a backwards frame 105, displayed later in time than reference frame 100.

In non-average mode operation, a predicted image is derived from either a forward image or backwards image, and thus have only one set of associated motion vectors in the x and y direction.

It is desirable that MPEG decoders increase the speed or efficiency at which they decode and decrease in cost. As the density of pixels within a video image increases, there is need for faster decoding of MPEG encoded video images. Insufficiently fast decoding leads for example to frame loss within a video that is noticeable to the human eye. Reducing the number of hardware elements in an MPEG decoder can reduce its cost.

What is needed is a method and apparatus to generate predicted images at a sufficiently fast rate with smooth display while reducing a number of hardware elements used.

SUMMARY

One embodiment of the present invention includes a computer system that performs motion compensation, the computer system including; a storage device, a memory unit that loads at least one error correction value and at least one reference component into the storage device; and a calculation unit coupled to receive the at least one reference component and the at least one error correction value from the storage device. In this embodiment, the calculation unit determines multiple predicted components in parallel and the calculation unit stores the multiple predicted components into the storage device.

One embodiment of the present invention includes a method of loading data in a first arrangement and storing the data in a second arrangement, where the first and second arrangements are different, including the acts of: loading the data, where the data is in a first arrangement; determining an arrangement to store the data; and selectively storing the data in the second arrangement.

One embodiment of the present invention includes a computer system that loads data in a first arrangement and stores the data in a second arrangement, the computer system includes: a storage device; a memory unit which loads the data from the storage device, the data being in a first arrangement; a second storage device; and a circuit, which according to an interleave code, selectively stores the data in the second storage device in a second arrangement, where the first and second arrangements are different.

The present invention will be more fully understood in light of the following detailed description taken together with the accompanying drawings.

BRIEF DESCRIPTION OF THE DRAWINGS

FIG. 3B depicts instructions of code segment 300 and associated parameters.

FIG. 4A depicts schematically a frame order arrangement of an image component.

FIG. 4B depicts schematically a field order arrangement of an image component in main memory.

FIG. 9 depicts a sample portion of a chrominance component stored in reference memory 204.

DETAILED DESCRIPTION

Overview of Motion Compensation Unit 200

Figure 2A:
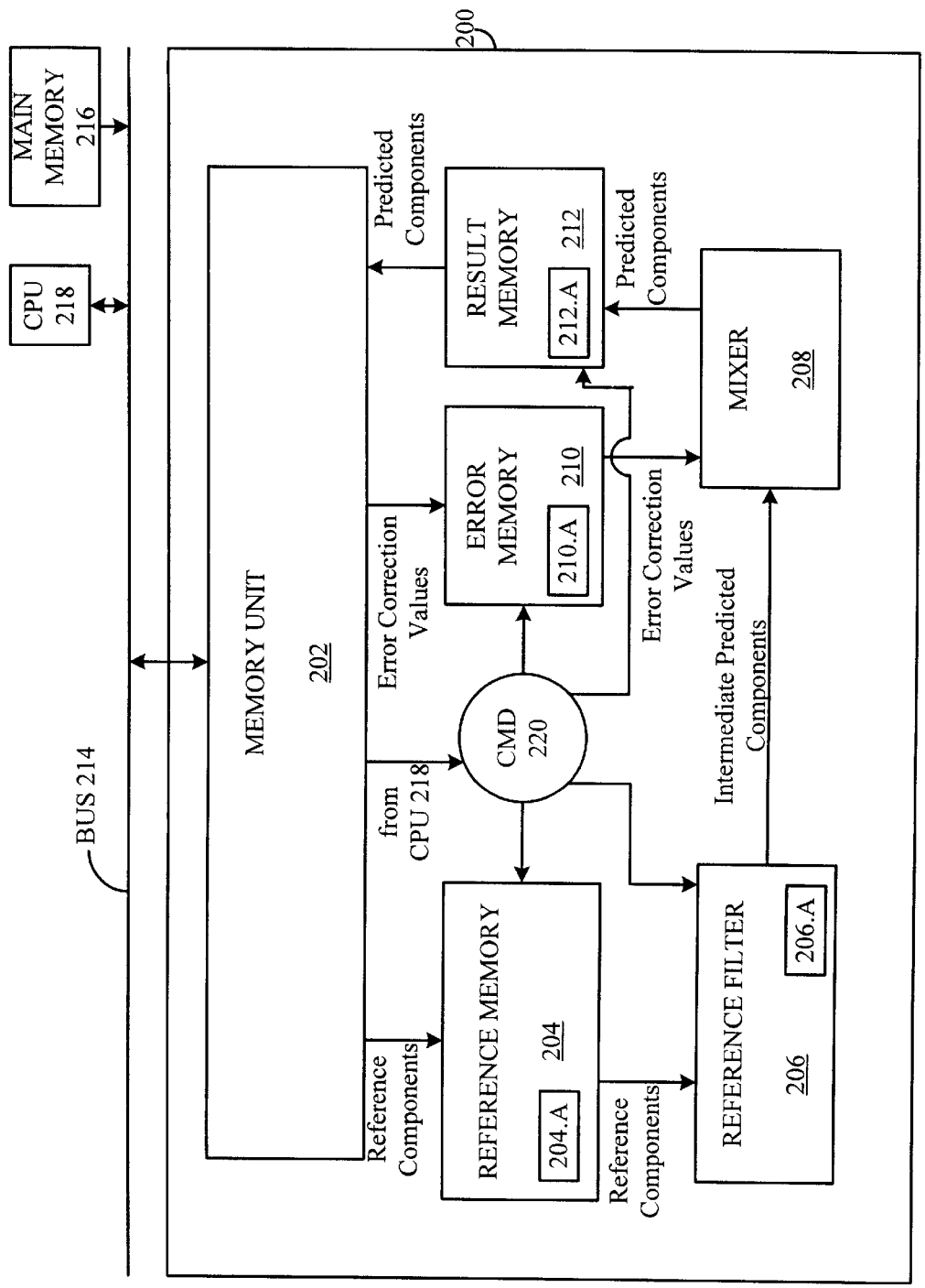
FIG. 2A depicts motion compensation unit 200, an exemplary device to implement an embodiment of the present invention.

An exemplary apparatus to implement an embodiment of the present invention is shown schematically in FIG. 2A as motion compensation unit 200. Motion compensation unit 200 includes command unit 220, conventional memory unit 202, reference memory 204, reference filter 206, mixer unit 208, error memory 210, and result memory 212. Memory unit 202 is coupled to a conventional bus 214. Motion compensation unit 200 communicates to peripheral devices such as main memory 216 and CPU 218 through bus 214.

In this embodiment, motion compensation unit 200 calculates four predicted pixel components in one clock cycle from pixel components of reference images. The MPEG standard requires that pixels be represented in terms of their components ("pixel components" or "components"), i.e., luminance, chrominance-red, or chrominance-blue. Luminance represents the brightness of each pixel. Chrominance-red and chrominance-blue together represent the color of a pixel. Thus in this embodiment, determining predicted pixels involves determining predicted pixel components.

Command unit 220 stores and distributes instructions to each of reference memory 204, reference filter 206, mixer unit 208, error memory 210, and result memory 212. CPU 218 stores instructions in main memory 216. Command unit 220 receives the instructions from main memory 216 and stores the instructions in a conventional processing queue (not depicted). Command unit 220 distributes instructions to instruction queues of specified devices. Command unit 220 further specifies address parameters associated with instructions of code segment 300 discussed in more detail later.

Main memory 216 stores components of reference images and components of predicted pixels. Components of predicted pixels can subsequently be used as reference images. The arrangement of components of reference images in main memory 216 is described in more detail later. Components of reference images are decoded in accordance with the MPEG standard and are stored in main memory 216. Predicted pixels are computed in accordance with embodiments of the present invention.

Conventional memory unit 202 loads pixel components associated with reference images, discussed above with respect to FIG. 1, from main memory 216 and stores them in reference memory 204. Each of reference memory 204, error memory 210, and result memory 212 instruct memory unit 202 to execute load or store operations. Memory unit 202 also coordinates transfer of predicted pixel components from result memory 212 to main memory 216. Memory unit 202 also loads "error correction values" from main memory 216 and stores them in error memory 210. Error correction values are well known in the art of MPEG.

Error correction values are included with video encoded under the MPEG standard. During decoding of the MPEG encoded video, the error correction are stored in main memory 216. Each error correction value is used to correct each intermediate predicted component calculated by the reference filter 206, discussed in more detail later. MPEG specifies error correction values that range from −255 to 255. In this embodiment, error correction values range from −32,768 to 32,767.

An exemplary reference memory 204 includes an 8 kilobyte static random access memory (SRAM), in part, for storing pixel components associated with reference images. Reference memory 204 loads reference pixel components into reference filter 206. Reference memory 204 further includes an instruction queue 204.A that stores up to 32 instructions provided by command unit 220. Reference memory 204 executes instructions in a first-in-first-out (FIFO) order. Reference memory 204 clears an instruction from its instruction queue 204.A after completing the instruction.

An exemplary error memory 210 includes an 8 kilobyte static random access memory (SRAM), in part, for storing error correction values. Error memory 210 loads error correction values to mixer 208. In this embodiment, error memory 210 further includes an instruction queue 210.A that stores one instruction provided by command unit 220. Error memory 210 clears an instruction from its instruction queue 210.A after completing the instruction.

An exemplary reference filter 206, in part, loads reference pixel components from reference memory 204 and calculates intermediate predicted components, that is, predicted pixel components prior to error correction and adjustment by mixer 208 in accordance with MPEG. Reference filter 206 stores intermediate predicted components in mixer 208. In this embodiment, reference filter 206 further includes an instruction queue 206.A that stores one instruction provided by command unit 220. Reference filter 206 clears an instruction from its instruction queue 206.A after completing the instruction.

An exemplary mixer unit 208, in part, performs error correction of intermediate predicted components from reference filter 206. Mixer unit 208 loads error correction values from error memory 210 and stores predicted pixel components in result memory 212.

An exemplary result memory 212 includes an 8 kilobyte static random access memory (SRAM), in part, for storing predicted pixel components from mixer 208. Memory unit 202 loads predicted pixel components from result memory 212 and stores them in main memory 216. In this embodiment, result memory 212 further includes an instruction queue 212.A that stores one instruction provided by command unit 220. Result memory 212 clears an instruction from its instruction queue 212.A after completing the instruction.

Implementation Using 3-D Graphics Texture Mapper

In one embodiment of the present invention, the motion compensation unit 200 uses functionality of a conventional 3-D graphics texture mapper. A description of the operation of the conventional 3-D graphics texture mapper is included in Appendix A, which is part of the present disclosure.

Overview of Execution of Code Segment 300 by Motion Compensation Unit 200

Figure 3A:
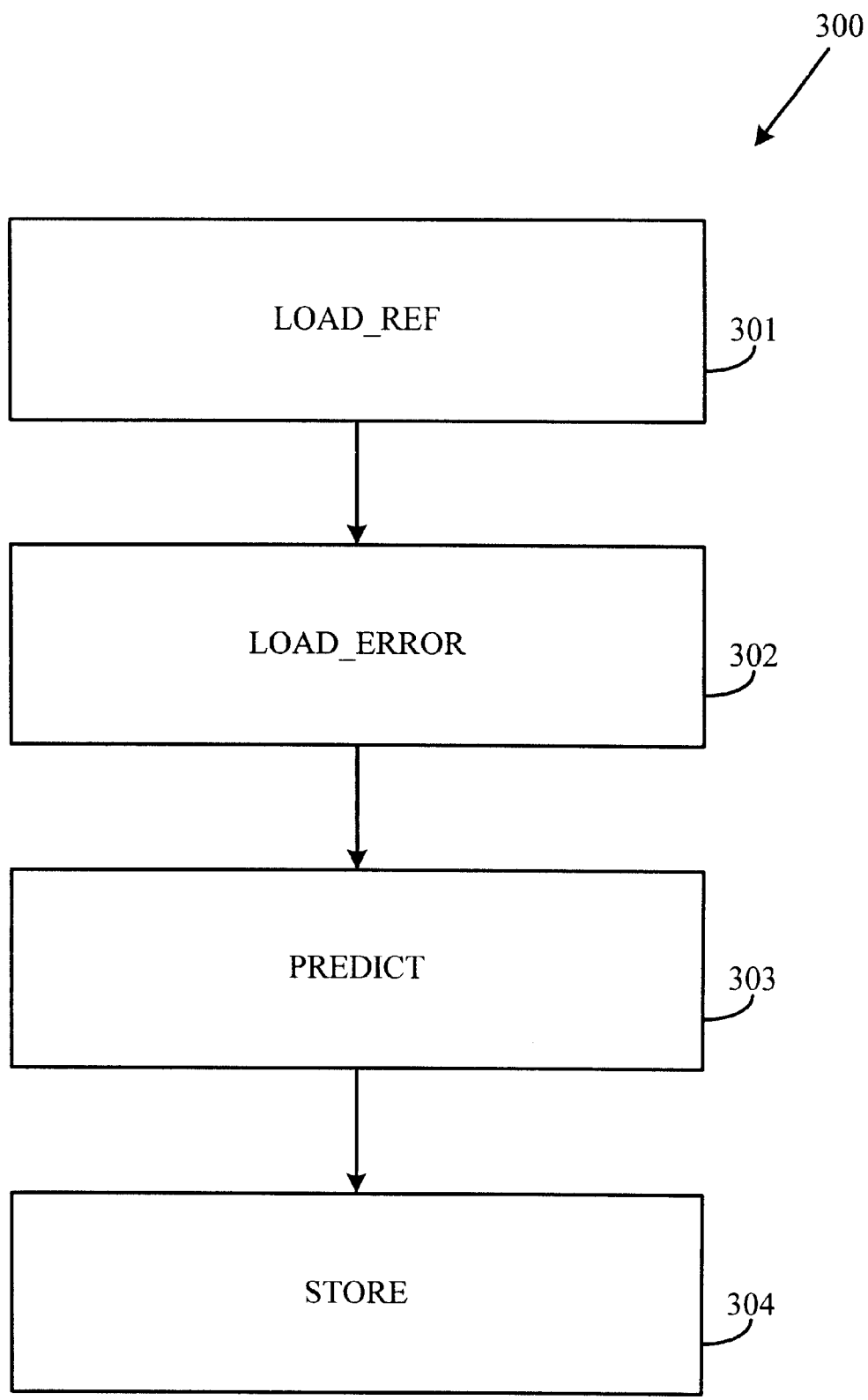
FIG. 3A depicts an illustrative code segment 300 in accordance with an embodiment of the invention for determining predicted pixels encoded according to the MPEG standard.

In accordance with an embodiment of the invention, motion compensation unit 200 of FIG. 2A executes code segment 300 of FIG. 3A to determine predicted pixel components encoded according to the MPEG standard. Code segment 300 includes instruction load_ref 301; instruction load_error 302; instruction predict 303; and instruction store 304.

In this embodiment, code segment 300 specifies a hardwired logic operation of motion compensation unit 200. In other embodiments, code segment 300 may be software instructions and motion compensation unit 200 executes operations specified by such software.

FIG. 3A merely illustrates a possible order of instructions 301 to 304. The execution of instructions 301 to 304 can vary as can the number of times a single instruction is executed. The operation of each instruction will be discussed in more detail later.

The following table, Table 1, provides an example association between instructions of code segment 300 and devices of motion compensation unit 200.

TABLE 1

| instruction | stored in instruction queue of |
|---|---|
| load_ref 301 | reference memory 204 |
| load_error 302 | error memory 210 |
| predict 303 | reference filter 206 |
| store 304 | result memory 212 |

The following table, Table 2, provides an example association between devices of motion compensation unit 200 and instructions such devices execute.

TABLE 2

| instruction | device(s) |
|---|---|
| load_ref 301 | memory unit 202; reference memory 204 |
| load_error 302 | memory unit 202; error memory 210 |
| predict 303 | reference filter 206; mixer 208; reference memory 204; error memory 210; and result memory 212 |
| store 304 | result memory 212; memory unit 202 |

In this embodiment, reference memory 204, reference filter 206, and mixer unit 208 together, and both error memory 210 and result memory 212 can operate independently of each other. For example, reference memory 204 can execute an instruction load_ref 301, error memory 210 can execute an instruction load_error 302, while reference filter 206 and mixer unit 208 together execute an instruction predict 303 and result memory 212 executes an instruction store 304.

Overview of Instruction Parameters

FIG. 3B depicts a table that illustrates instructions of code segment 300 and associated parameters that are stored in process cache of command unit 220.

The operation of instruction load ref 301 is specified by parameters "ref_mem_addr", "ref_addr", "size", "width", and "interleaving" that are provided with the instruction. Parameter "ref_mem_addr" specifies the address in main memory 216 of the upper left hand corner of either a left side segment or right side segment surrounding a reference region to load. Parameter "ref_addr" specifies an address in reference memory 204 to store reference pixel components. Command unit 220 specifies parameter "ref_addr". Parameter "size" specifies a number of 32 byte data transfers in a single execution of instruction load_ref. Parameter "width" specifies whether a data line in main memory 216 is 8 bytes or 16 bytes. Parameter "interleaving" specifies whether memory unit 202 should store the components in reference memory 204 in either field and frame arrangements.

The operation of instruction load_error 302 is specified by parameters "err_mem_addr", "err_addr", and "blocks". Parameter "err_mem_addr" specifies the address in main memory 216 of the beginning of an 8×8 matrix of error correction values. Parameter "err_addr" specifies the address in error memory 210 to store the first loaded matrix of error correction values. Command unit 220 specifies parameter "error_addr". Memory unit 202 determines whether to load error correction values according to parameter "blocks".

The operation of instruction predict 303 is specified by parameters "ref_pending", "err_pending", "FwdRefAddr", "BwdRefAddr", "chroma", "rows", "FwdFracX", "FwdFracY", "BwdFracX", and "BwdFracY", "BidirFrac", "err_addr", "p_blocks", "err_interleave", "result_addr", and "result_interleave". Parameter "ref_pending" specifies a number of operations of instruction "load_ref" remaining before beginning execution of instruction "predict". Parameter "err_pending" specifies how many executions of instruction "load_error" remain for error memory 210 to execute prior to execution of instruction "predict". Parameters "FwdRefAddr" and "BwdRefAddr" specify the addresses in reference memory 204 of the beginnings of the respective forward and backwards reference regions of interest, located within left and right sides described earlier. For non-average mode macroblocks, parameter "BwdRefAddr" is ignored. Command unit 220 specifies parameters "FwdRefAddr" and "BwdRefAddr". Parameter "chroma" specifies whether pixel components loaded from reference memory 204 are chrominance type. Parameter "rows" specifies a number of data lines in reference memory 204 that are to be loaded by reference filter 206. Parameters "FwdFracX", "FwdFracY", "BwdFracX", and "BwdFracY" are derived from motion vectors in the x and y direction, specified in the encoding of predicted images. Parameter "BidirFrac" specifies whether intermediate predicted components, variable "Out_n", are computed by average mode. Parameter "err_addr" specifies the beginning address of a matrix of error correction values associated with a first coded 8×8 block of components in a sequence of four 8×8 blocks of components. Parameter "p_blocks" specifies which of the four 8×8 blocks is/are coded. Parameter "err_interleave" specifies whether to access the error correction values in a field or a frame order. Parameter "result_addr" specifies an address in result memory 212 to store predicted components. Parameter "result_interleave" specifies an arrangement in which the predicted components are stored in result memory 212.

The operation of instruction store 304 is specified by parameters "store_mem_addr", "result_addr", and "store_rows". Parameter "store_mem_addr" specifies an address in main memory 216 to store the predicted components calculated in instruction predict 303. Parameter "result_addr" specifies the beginning address in result memory 212 in which four predicted components are stored. Command unit 220 specifies parameter "result_addr". Parameter "store_rows" specifies the number of lines of data in main memory 216 that are written to in an execution of instruction store.

Storage of Components in Main Memory 216

Figures 4A, 4B:
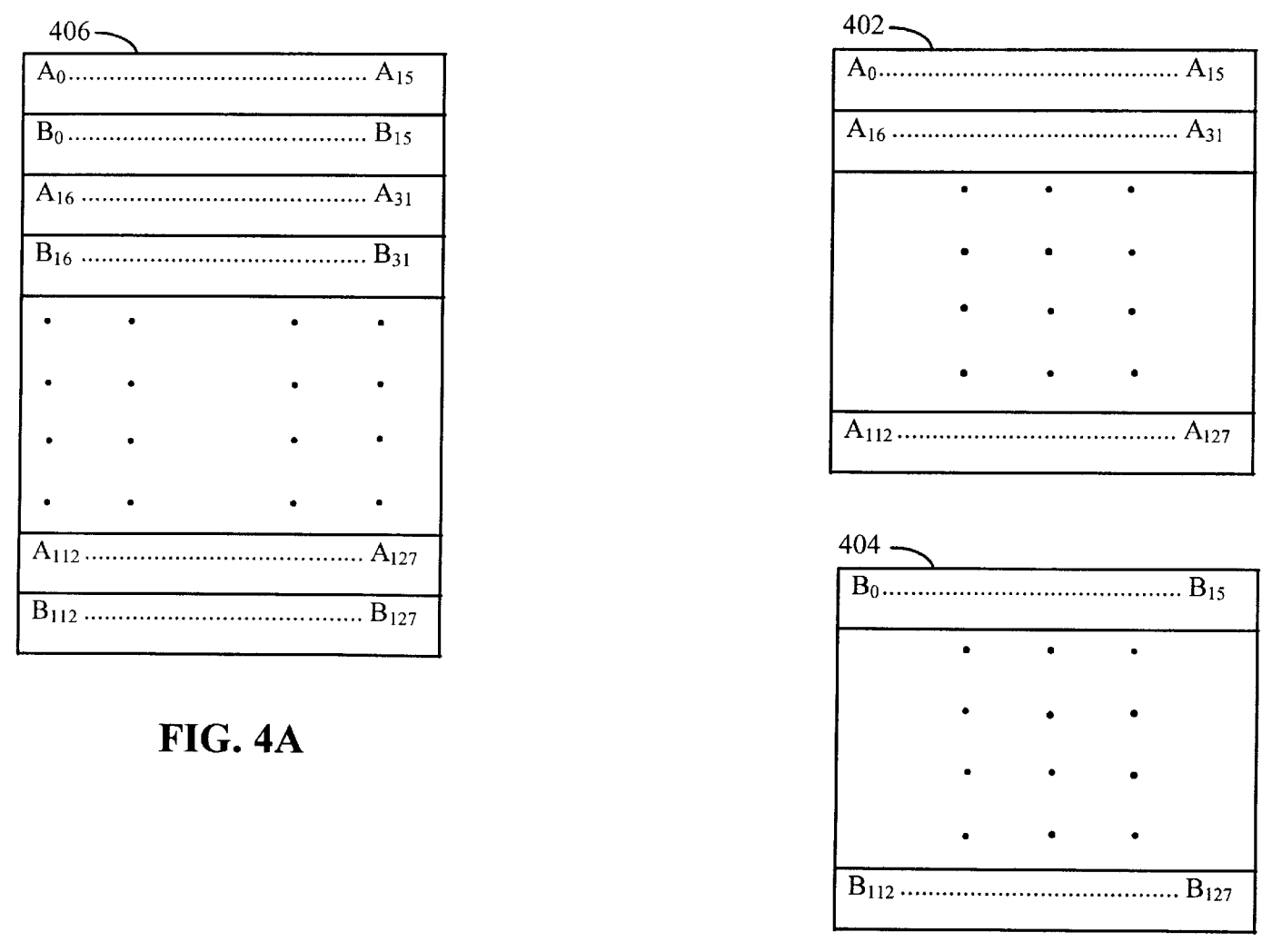

The components may be stored in main memory 216 in either "field" or "frame" formats. FIGS. 4A and 4B depict schematically a difference between field and frame format images. In frame format, shown as arrangement 406 in FIG. 4A, each component type, i.e., luminance, chrominance-red, or chrominance-blue, is ordered in the same manner as pixels within the corresponding image. That is, even rows denoted by variable A, are interleaved with odd rows, denoted by variable B. In field format, as shown in FIG. 4B, even rows (A0 to A127) and odd rows (B0 to B127) of the component in frame format of FIG. 4A are stored in separate fields, respective even field 402 and odd field 404.

Figure 5:
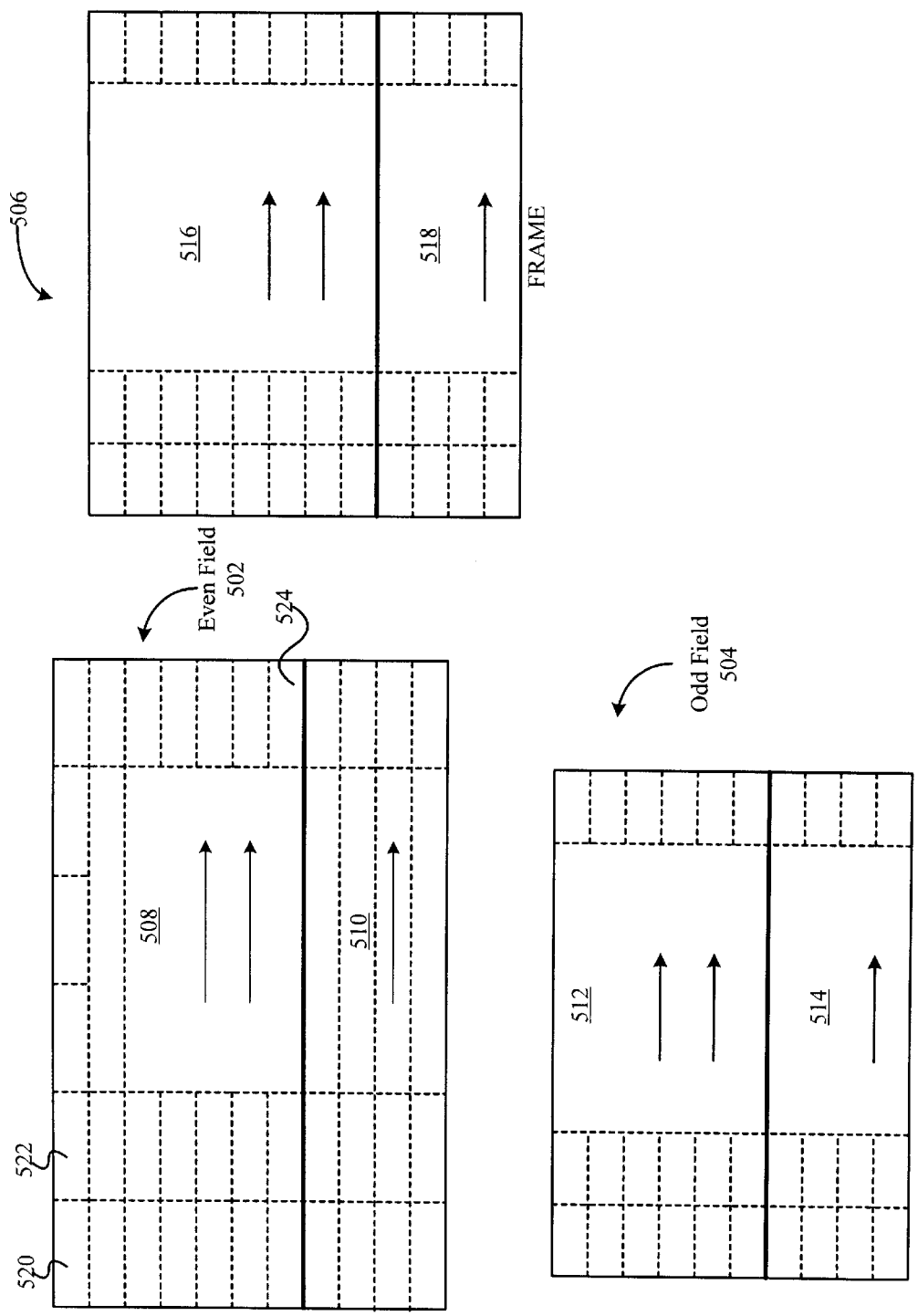
FIG. 5 schematically illustrates luminance and chrominance components of an image arranged in field and frame orders.

FIG. 5 schematically illustrates separate luminance and chrominance components of an image arranged in field and frame orders, discussed with respect to FIGS. 4A and 4B. FIG. 5 depicts even field 502 that includes a luminance component 508 and chrominance component 510 that each correspond to even lines of an image. Odd field 504 includes luminance component 512 and chrominance component 514 that each correspond to odd lines of an image. Frame field 506 includes luminance component 516 and chrominance component 518 that correspond to all lines of an image. As shown in broken lines in FIG. 5, each component of an image (luminance and chrominance) is further divided into columns and rows.

An exemplary manner in which to store the components in main memory 216 will now be described. For all components, columns of components are stored in main memory 216 beginning with the top row of the left most column continuing to the bottom row of the same column, then the top row of the second left most column, continuing to the bottom row of the second left most column, and continuing to the bottom row of the right most column. In this embodiment, luminance and chrominance components are stored separately in main memory 216. Furthermore, even field order components, odd field components, and frame order components are stored separately in main memory 216. In this embodiment, columns can be either 8 or 16 bytes wide.

For example, for luminance component 508 of even field 502, the first element stored is element 520, which corresponds to the component of the top row of the left most column, the remaining elements in the left most row are then stored and the process continues for element 522 of the next left most column. The last element stored is 524.

Instruction Load_Ref

Referring to code segment 300 of FIG. 3A, motion compensation unit 200 first executes instruction load_ref 301. Instruction load_ref instructs memory unit 202 to load pixel components associated with reference images, discussed above with respect to FIG. 1, from main memory 216 and store the pixel components in reference memory 204. In this embodiment, each execution of instruction load_ref 301 loads a distinct component, either luminance or chrominance. Further, portions of distinct fields, i.e., odd or even, are loaded in distinct executions of instruction load_ref 301.

Figure 6:
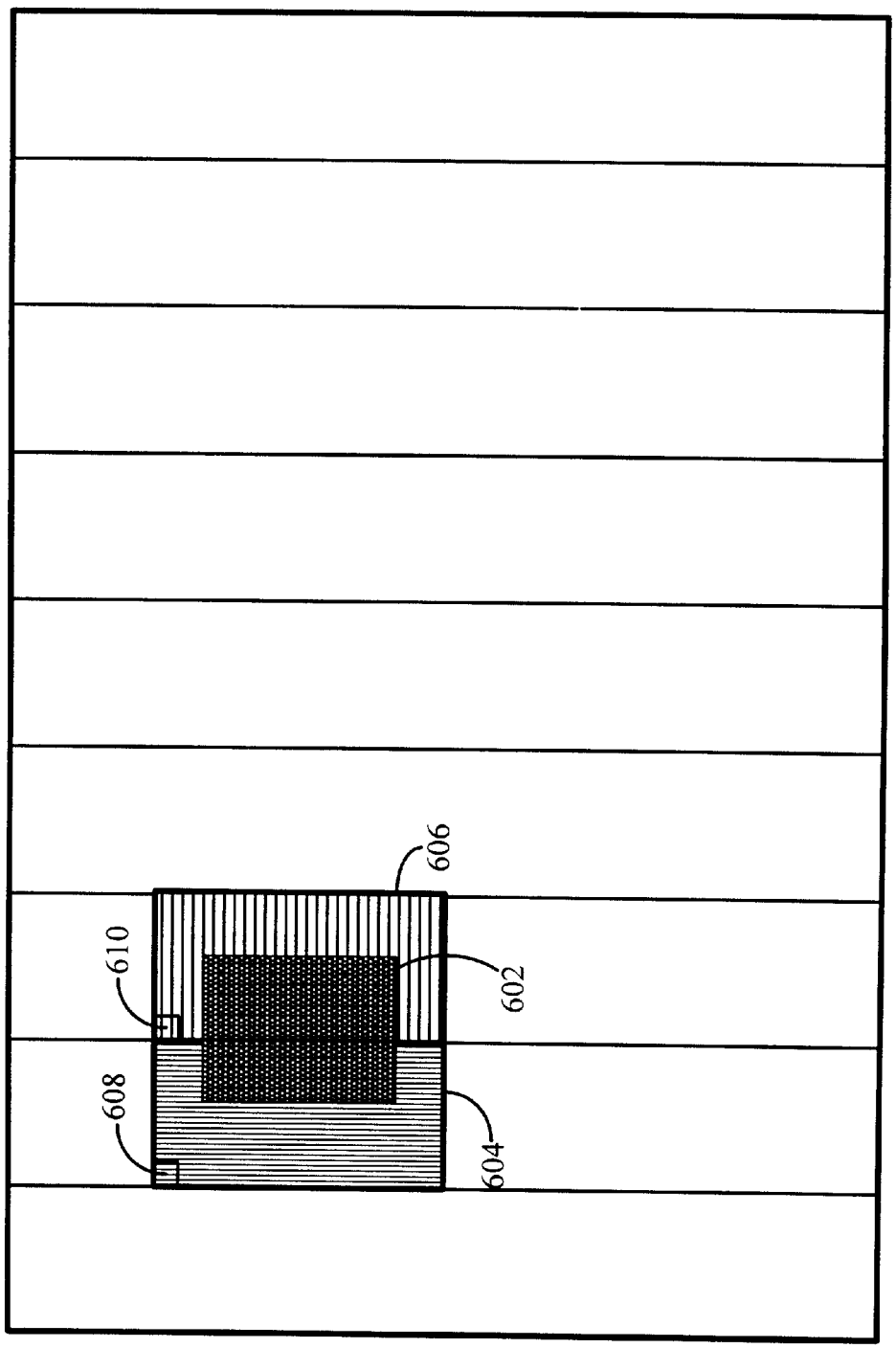
FIG. 6 depicts a spatial orientation of a luminance component of a reference image 602 positioned among two columns of a frame.

Often components of a reference image, forward or backwards, discussed earlier, will be positioned between two columns of an image frame but not aligned at the boundaries of the two columns. FIG. 6 depicts an orientation of a luminance component of a reference image 602 positioned among two columns. In this embodiment, to retrieve components of the reference image positioned between two columns, memory unit 202 retrieves portions of the left side column and right side column around the reference image from main memory 216 and stores the portions in reference memory 204. Parameter "ref_mem_addr" provided with instruction load_ref 301, specifies the address in main memory 216 of the upper left hand corner of either a left side or right side surrounding a reference image. Thus, in this embodiment, loading components of a reference image requires multiple executions of instruction load_ref in order to load both the left and right sides. Memory unit 202 stores either the left or right hand portions of components of the forward or backwards reference images in reference memory 204 beginning with the address specified by parameter "ref_addr".

For example, referring to FIG. 6, in one execution of instruction load_ref 301, "ref_mem_addr" specifies upper left hand corner component 608 of left side 604 and parameter "ref_addr" specifies a location in reference memory 204 to begin storing upper left hand corner component 608 of left side 604. In another execution of load_ref, "ref_mem_addr" would specify upper left hand corner component 610 of right side 606 and parameter "ref_addr" would specify a location in reference memory 204 to begin storing upper left hand corner component 608 of right side 606.

Figure 1:
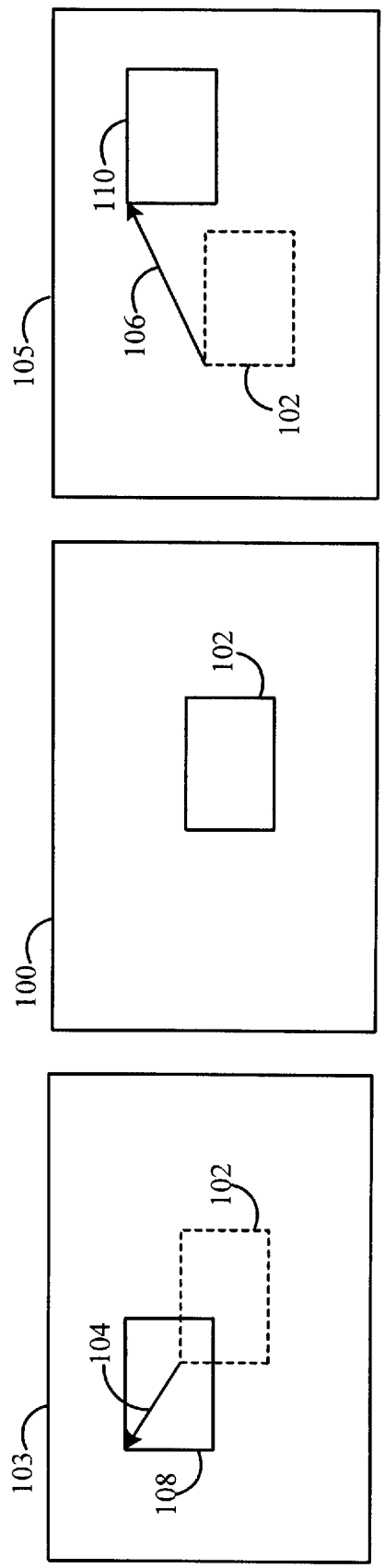
FIG. 1 depicts a predicted image 102 with motion compensation vectors 104 and 106 that point to locations of respective forward reference image 108 and backwards reference image 110.

Parameter "interleaving" specifies an arrangement that the loaded image components will be stored in reference memory 204. Where parameter "interleaving"=0, a component will be loaded and stored in reference memory 204 in the same arrangement that it was stored in main memory 216. That is, where a component is stored in a frame arrangement in main memory 216, it will be stored in a frame arrangement in reference memory 204 and where a component is stored as separate odd and even fields in main memory 216, it will be stored in reference memory 204 as separate odd and even fields.

Where parameter "interleaving"=1, even and odd field lines of a component in main memory 216 are stored together in a frame arrangement in reference memory 204.

Where parameter "interleaving"=2, even field lines of a component of a reference image are ignored and only the odd field lines are stored in reference memory 204. Where parameter "interleaving"=3, odd field lines of a component of a reference image are ignored and only the even field lines are stored in reference memory 204. When parameter "interleaving"=2 or 3, reference images are stored in a frame format in main memory 216, but are to be stored in the reference memory 204 in a field arrangement. Thus for example, referring to FIG. 1, where "interleaving"=2, odd rows of a component of a backwards reference image 110 of FIG. 1 are loaded from main memory 216 and stored into reference memory 204. Where parameter "interleaving"=3, even rows of a component of forward reference image 108 of FIG. 1 are loaded from main memory 216 and stored into reference memory 204.

Thus through use of parameter "interleaving", instruction load_ref allows memory unit 202 to flexibly load field and frame arrangements from main memory 216 and store the loaded arrangements in either field and frame arrangements.

Parameter "size" specifies a number of 32 byte data transfers in a single execution of instruction load_ref. Parameter "width" specifies whether a data line in main memory 216 is 8 bytes or 16 bytes. In this embodiment, in one execution of instruction load_ref, the most data that can be loaded is components corresponding to a 16 pixel by 32 pixel image.

In this embodiment, for average mode macroblocks, memory unit 202 loads left and right sides of a forward reference image component first and left sides and right sides of a backwards reference image component next. For non-average mode macroblocks (only coded with respect to a forward or backward reference image), memory unit 202 loads left and right sides of components of a forward or backward reference image only. According to the MPEG standard, the coding of pixels within the predicted image specify whether the pixels are average mode and if they are coded with respect to either forward or backwards reference pixels.

CPU 318 tracks the amount of data stored in the reference memory 204 and the locations of the unprocessed components in reference memory 204. CPU 318 provides instruction load_ref for execution by reference memory 204 so that the reference memory 204 always has data available for processing by reference filter 206 and thus the motion compensation unit 200 is not idle from waiting for components. The CPU further establishes the location of any incoming data, parameter "ref_addr", to avoid writing over unprocessed components.

Instruction Load_Error

Referring to FIG. 3A, next, motion compensation unit 200 executes instruction load_error 302. Instruction load_error instructs memory unit 202 (FIG. 2A) to load up to eight matrices of error correction values from main memory 216 and store the error correction values in error memory 210. In this embodiment, each error correction value is 16 bits, and each error correction value matrix contains 64, 16 bit terms.

In this embodiment, error memory 210 determines whether to load error correction values according to parameter "blocks". Parameter "blocks" specifies which of eight matrices of 8 components by 8 components (an 8×8 component matrix is a "block") will require error correction. Blocks that require error correction are "coded". In this embodiment parameter "blocks" is an 8 bit field, where each bit specifies which of eight 8×8 blocks of predicted components require error correction. The following depicts a format of the parameter "blocks":

| | | | bit | | | | |
|---|---|---|---|---|---|---|---|
| 7 | 6 | 5 | 4 | 3 | 2 | 1 | 0 |
| Cb | Cr | Cb | Cr | Y | Y | Y | Y. |

Letter "Y" represents a specific 8×8 block of luminance components, "Cb" represents a specific 8×8 block of blue-chrominance components, and "Cr" represents a specific 8×8 block of red-chrominance components. Bits 0 to 7 represent which of the eight blocks are coded.

In this embodiment, parameter "err_mem_addr" specifies the address in main memory 216 of a matrix of error correction values corresponding to the first coded block. For example where "blocks" is 0001 0110, memory unit 202 loads error correction values for blocks of luminance components corresponding to bits 1 and 2 and a block of red-chrominance components corresponding to bit 4. Parameter "err_mem_addr" specifies the address in main memory 216 of an error correction value matrix corresponding to the beginning of the first coded block, bit 1. In this embodiment, non-zero error correction value matrices are stored sequentially in main memory 216. Thus error correction value matrices associated with bits 1, 2, and 4 are stored sequentially in main memory 216.

In this embodiment, if parameter "blocks" is 0000 0000 then no blocks are coded and memory unit 202 loads no error correction values.

Parameter "err_addr" specifies the address in error memory 210 to store a first matrix of error correction values. In this embodiment, error memory 210 stores matrices of error correction values corresponding to coded blocks and skips over data space having a length of a matrix. Referring to the previous example where "blocks" is 0001 0110, error memory 210 skips over the length of the matrix and then stores error correction values corresponding to bits 1 and 2, skips over the length of the matrix, stores error correction values corresponding to bit 4, and skips over three lengths of the matrix.

Instruction Predict

Figure 7:
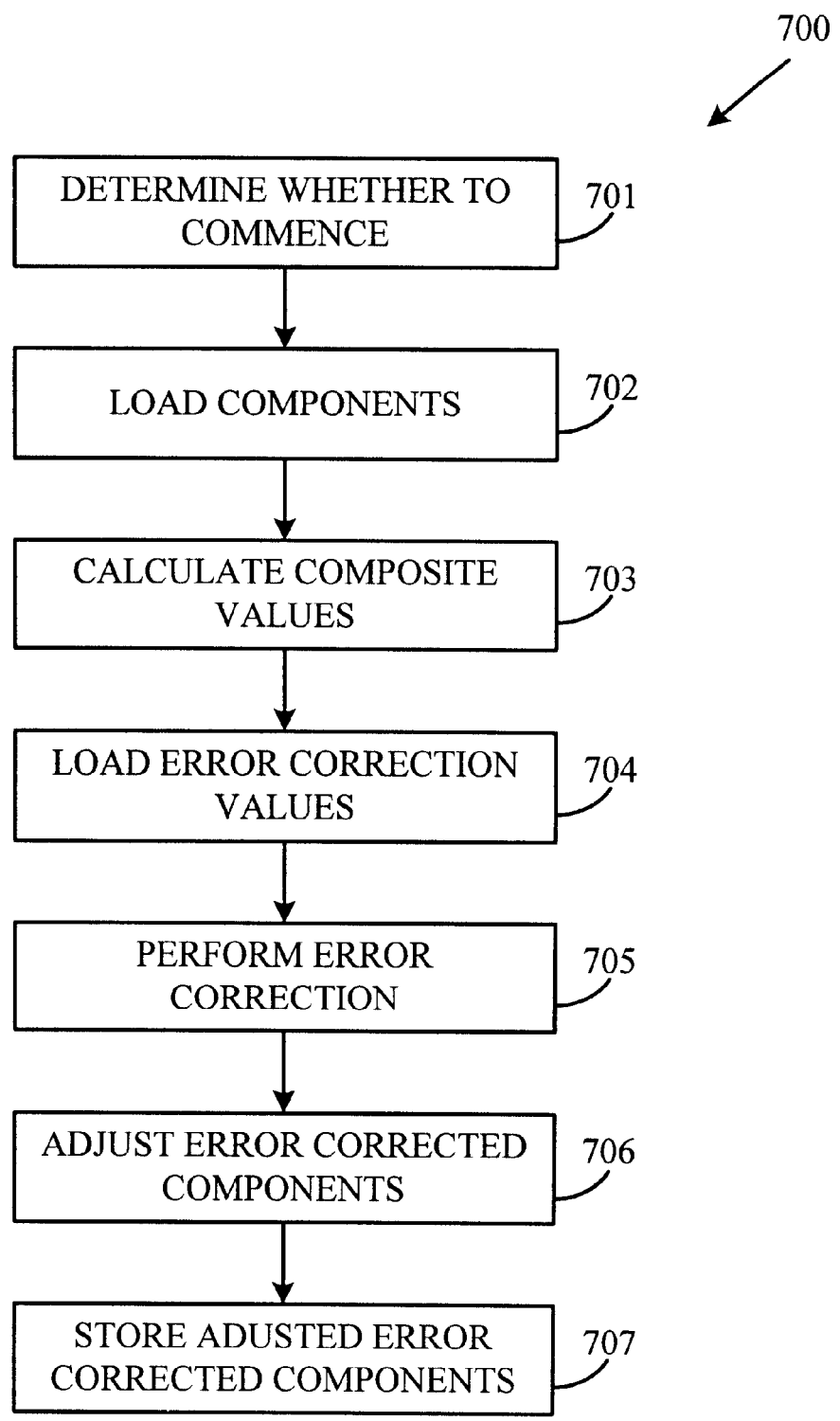
FIG. 7 depicts a flow diagram 700 of instruction predict.

Referring to FIG. 3A, next motion compensation unit 200 executes instruction predict 303. In this embodiment, instruction predict instructs motion compensation unit 200 to both calculate and store four predicted components to result memory 212 within one clock cycle. Thus within one clock cycle, instruction predict instructs reference filter 206 to load pixel components from reference memory 204, mixer 208 to load error correction values from error memory 210, and reference filter 206 and mixer 208 together to calculate predicted components and store them in result memory 212. FIG. 7 depicts a flow diagram of instruction predict.

Parameter "ref_pending" specifies a number of operations of instruction "load_ref" remaining before beginning execution of instruction "predict". For example, one order of instructions in processing queue (not depicted) of command unit 220 could be:

| instruction number | |
|---|---|
| 0 | load_ref 301 |
| 1 | load_ref 301 |
| 2 | load_ref 301 |
| 3 | load_ref 301 |
| 4 | predict 303 |

Command unit 220 distributes instruction load_ref, instructions numbered 0 to 3 to the instruction cache associated with reference memory 204 and instruction predict to reference filter 206. In this embodiment, reference memory 204 can operate independently of reference filter 206. For example, where parameter "ref_pending" is four, motion compensation unit 220 executes instruction predict with four executions of load_ref remaining, i.e., at the same time reference memory 204 executes instruction number 0.

For example, where parameter "ref_pending" is two, reference filter 206 and mixer unit 208, together, execute instruction predict with two executions of load_ref remaining, i.e., before instruction number 2, and simultaneously reference memory 204 executes, in series, instructions numbered 2 and 3 (instruction load_ref).

Parameter "err_pending" specifies how many executions of instruction "load_error" remain for error memory 210 to execute prior to execution of instruction "predict".

Referring to FIG. 7, in 701, reference filter 206 inspects parameters "ref_pending" and "err_pending" and the instruction queues of reference memory 204 and error memory 210 to determine whether to commence executing instruction predict. When the number of remaining executions of instruction load_ref in the instruction queue of reference memory 204 and the number of remaining executions of instruction load_error in the instruction queue of error memory 210 match or are less than the respective values of parameter "ref_pending" and "err_pending", reference filter 206 commences execution of instruction predict.

In 702, reference filter 206 loads four sets of components from reference memory 204. In this embodiment, reference filter 206 first loads four sets of four components of a forward reference image in parallel and then loads four sets of four components of a backwards reference image in parallel. Parameters "FwdRefAddr" and "BwdRefAddr" specify the addresses in reference memory 204 of the beginnings of the respective forward and backwards reference regions of interest. For non-average mode macroblocks, parameter "BwdRefAddr" is ignored.

In this embodiment, in executing instruction predict, reference filter 206 can flexibly load components from reference memory 204 in either 8 or 16 byte increments. Parameter "width" specifies whether reference filter 206 loads in either 8 or 16 byte increments.

In this embodiment, in a single execution of step 702, reference filter 206 loads only a single type of component from reference memory 204, i.e., either luminance or chrominance. Further, in this embodiment, where components are stored in reference memory 204 in a field arrangement, only one field is read in a single execution of step 702, i.e. even or odd.

Figure 8:
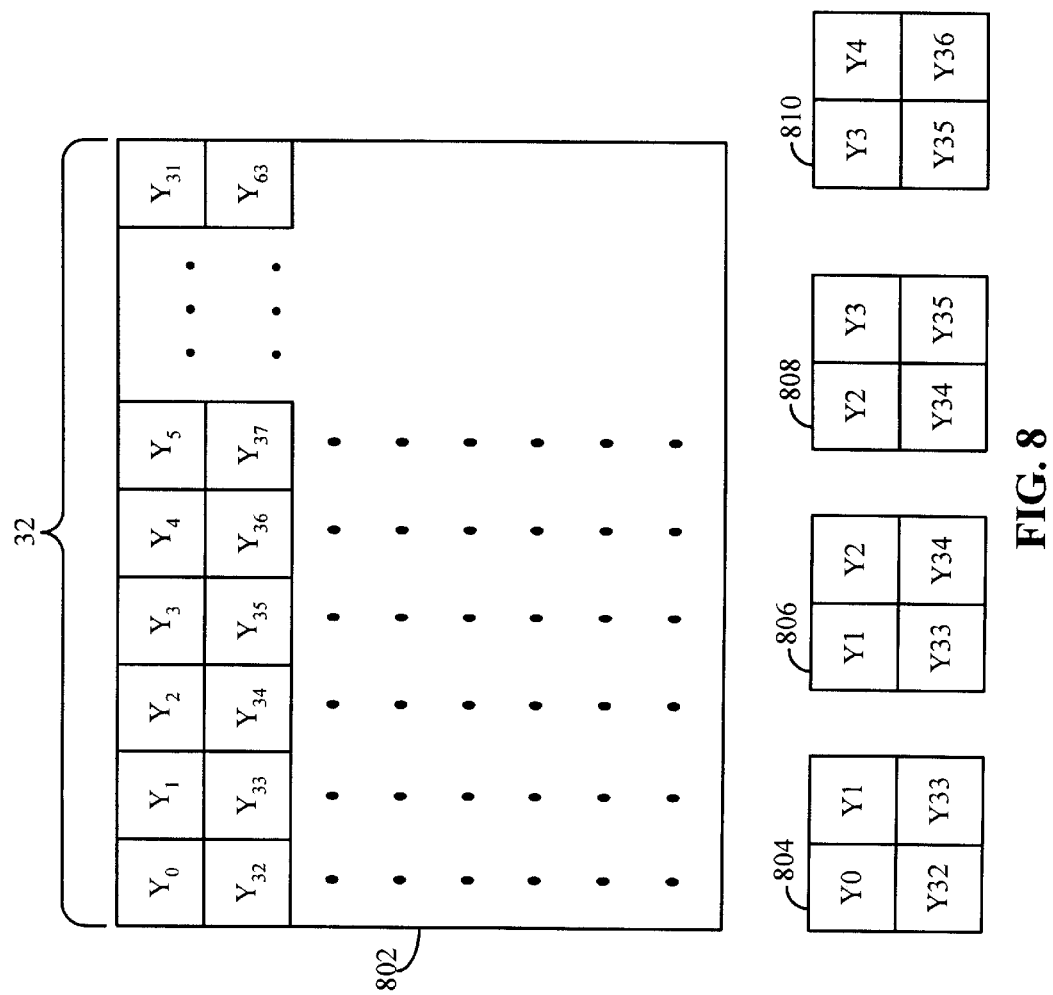
FIG. 8 depicts a sample reference region 802, either forward or backwards, and four sets of four components 804, 806, 808, and 810 read during a first read from reference memory 204.

FIG. 8 depicts an example of components read during a first load by reference filter 206 from a forwards reference region 802. For example, a first set 804 of four components (Y0, Y1, Y32, Y33) is read from the top left corner of the reference region, a second set 806 of four components (Y1, Y2, Y33, Y34) overlaps with the right side components of first set 804 (Y1, Y33), a third set 808 of four components (Y2, Y3, Y34, Y35) overlaps with the right side components of second set 806 (Y2, Y34), and a fourth set 810 of four components (Y3, Y4, Y35, Y36) overlaps with the right side components of third set 808 (Y3, Y35).

Parameter "chroma" indicates whether reference region is a combined chrominance-red and chrominance-blue components. Chrominance components are stored in the reference memory 204 as chrominance-red alternating with chrominance-blue. In this embodiment, where parameter "chroma" indicates loading of chrominance components, reference filter 206 loads two sets of four chrominance-red type components and two sets of four chrominance-blue type components in a single execution of step 702.

Figure 9:
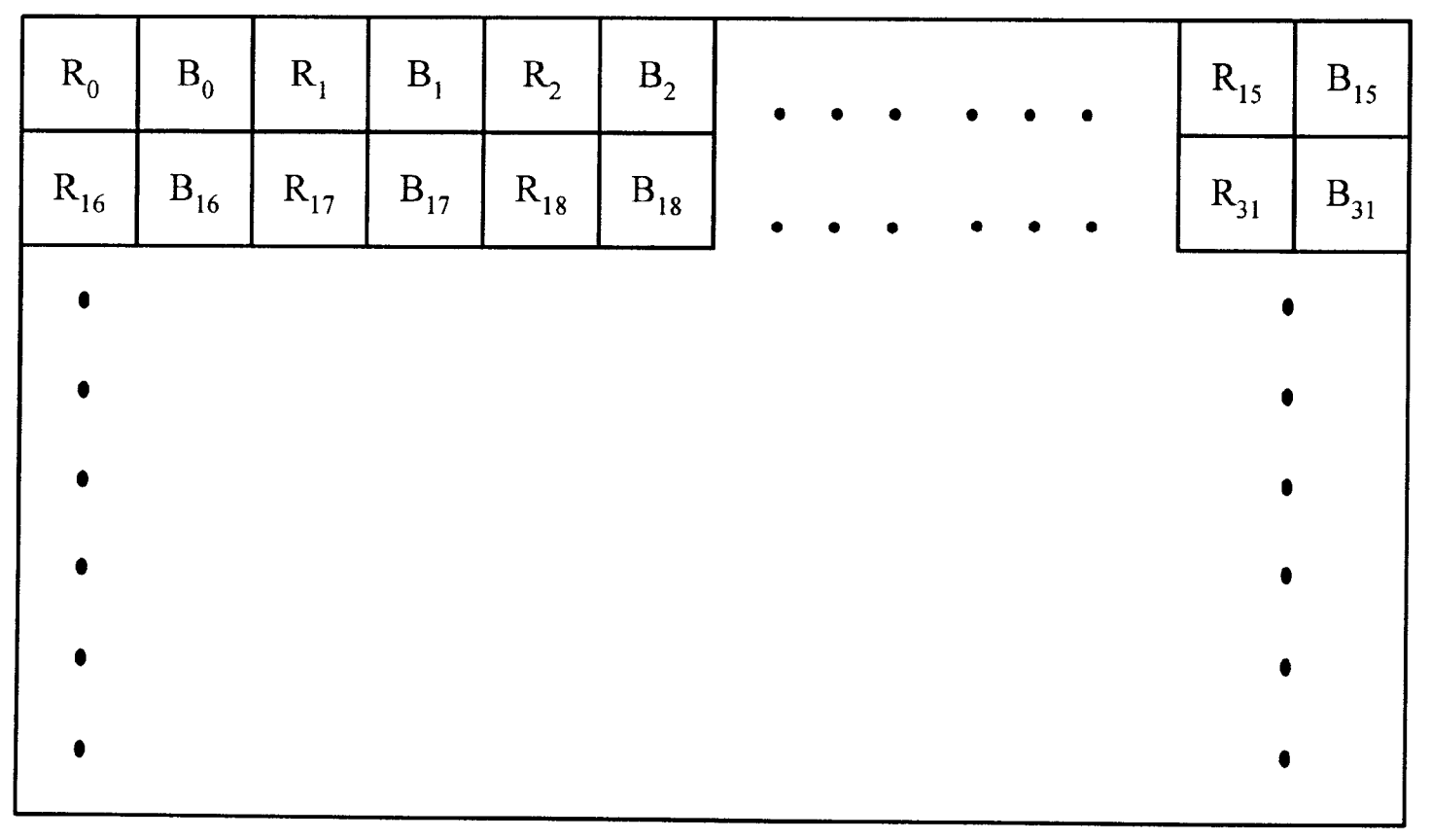

FIG. 9 depicts a sample portion of a chrominance component. For example, in a first load of chrominance components, i.e. two sets of chrominance-red components and two sets of chrominance-blue components, reference filter 206 reads the following components:

| R0 | R1 | B0 | B1 | R1 | R2 | B1 | B2 |
|----|----|----|----|----|----|----|----|
| R16 | R17 | B16 | B17 | R17 | R18 | B17 | B18. |

Thereafter, in a subsequent execution of step 702, for a subsequent read from a reference region, reference filter 206 reads four sets of four components in parallel in a similar manner as in the first read, beginning with the two right side components of a right most set. For example referring to FIG. 8, in a second read, a first set of four components would consist of:

Y4 Y5
Y36 Y37.

Referring to FIG. 7, in 703, reference filter 206 calculates four composite values for each four set of four components. Each composite value represents a pre-error corrected predicted component ("intermediate predicted component"). Variable "Out_n", where n is 0, 1, 2, or 3, represents the four intermediate predicted components.

The following formulas, specified in the MPEG standard, specify variable "Out_n".

$$\begin{aligned}
\text{Out\_n} = &\ (\text{for\_ref}^* (4-\text{BidirFrac}) + \\
&\ \text{bak\_ref}^* (\text{BidirFrac}) + 2\ ) / 4 \\
\text{where} \\
\text{for\_ref} = &\ (f^*(4-\text{FwdFracX}) * (4-\text{FwdFracY}) + \\
&\ fx^* (\text{FwdFracX}) * (4-\text{FwdFracY}) + \\
&\ fy^* (4-\text{FwdFracX}) * (\text{FwdFracY}) + \\
&\ fxy^* (\text{FwdFracX}) * (\text{FwdFracY}) + 8) / 16 \\
\text{bak\_ref} = &\ (b^*(4-\text{BwdFracX}) * (4-\text{BwdFracY}) + \\
&\ bx^* (\text{BwdFracX}) * (4-\text{BwdFracY}) + \\
&\ by^* (4-\text{BwdFracX}) * (\text{BwdFracY}) + \\
&\ bxy^* (\text{BwdFracX}) * (\text{BwdFracY}) + 8) / 16
\end{aligned}$$

In this embodiment, reference filter 206 calculates intermediate predicted components, Out_0, Out_1, Out_2, and Out_3 within one clock cycle.

In the equation, variables f, fx, fy, and fxy represent a set of four components associated with forward reference pixels. Variables b, bx, by, and bxy represent a set of four components associated with backwards reference pixels. Reference filter 206 loaded each of the sets in step 702. For example, for Out_0, if reference region 802 of FIG. 8 corresponds to a forward reference region, "f" would correspond to Y0, "fx" would correspond to Y1, "fy" would correspond to Y8, and "fxy" would correspond to Y9. Similarly, if reference region 802 of FIG. 8 corresponds to a backwards reference region, "b" would correspond to Y0, "bx" would correspond to Y1, "by" would correspond to Y8, and "bxy" would correspond to Y9.

In the equation, if an x component of a forward motion vector is a non-integer and includes a half pixel offset, then parameter "FwdFracX" is a 2, and otherwise a 0. Similarly, if a y component of a forward motion vector is a non-integer and includes a half pixel offset, then parameter "FwdFracY" is a 2, and otherwise a 0. If the x component of a backwards motion vector is a non-integer and includes a half pixel offset, then parameter "FwdFracX" is a 2, and otherwise a 0. If the y component of a backwards motion vector is a non-integer and includes a half pixel offset, then parameter "FwdFracY" is a 2, and otherwise a 0. Thus in this embodiment, each of "FwdFracX", "FwdFracY", "BwdFracX", and "BwdFracY" can be 0 or 2. In other embodiments, where a different video standard is used, "FwdFracY", "FwdFracX", "BwdFracX", and "BwdFracY" can be 1 or 3.

In the equation, parameter "BidirFrac" specifies whether the intermediate predicted component "Out_n" is computed by average mode. In this embodiment, parameter "BidirFrac" can be 0 or 2. Where parameter "BidirFrac" is 2, "Out_n" is computed by average mode. Where "BidirFrac" is 0, "Out_n" consists solely of variable for_ref. Note that, as discussed earlier, variable for_ref can represent either forwards or backwards components. In this embodiment, for non-average mode operation, components of forward or backward reference images are stored as forward reference images.

Subsequently, reference filter 206 passes intermediate predicted components, Out_0, Out_1, Out_2, and Out 3 to mixer 208.

In 704, mixer unit 208 loads the error correction values associated with the four intermediate predicted components where non-zero error correction values are associated with the four intermediate predicted components. Parameter "err_addr" specifies an address in error memory 210 that corresponds to the associated error correction values. The arrangement in which to load and store the error correction values, i.e., frame or field, is specified by parameter "err_interleave".

Parameter "p_blocks" specifies whether mixer 208 should load error correction values from error memory 210. In this embodiment, parameter "p_blocks" is a four bit value and specifies which of four blocks are coded. Parameter "p_blocks" only specifies which of four blocks are coded because a single execution of instruction predict processes only one type of component and an execution of instruction load_error loads error correction values corresponding to at most four blocks of one type of component. Mixer unit 208 first determines whether a block associated with the four intermediate predicted components is coded in parameter "p_blocks". If so, mixer unit 208 loads error correction values associated with the four intermediate predicted components from error memory 210. Every block of components marked as uncoded in parameter "p_blocks" is not error corrected and thus mixer unit 208 does not load error correction values in such cases.

For example, where "p_blocks" is 0010 and instruction predict loads luminance type components in step 702, parameter "err_addr" specifies the address in error memory 210 of the beginning of the error correction matrix corresponding to the first block of luminance components. Mixer unit 208 loads only error correction values associated with the four intermediate predicted components from reference filter 206 from the error correction matrix, stored in error memory 210, corresponding to the second block of 8×8 luminance components.

Parameter "err_interleave" specifies whether to load the error correction values in a field or a frame order. Error correction values may be stored in field or frame arrangement in error memory 210. Similarly, the intermediate predicated components may be in field or frame arrangement. To ensure that an error correction value is added to its associated composite value, in this embodiment, the error correction values are stored in an arrangement in the mixer unit 208 that matches the arrangement of the components, i.e., field or frame: In this embodiment, where "err_interleave"=2, error correction values are stored in field format in error memory 210 but are to be loaded and stored in a frame order, the arrangement of the intermediate predicted components. Thus error correction values are loaded from a row of even fields and then a row of odd fields in an alternating fashion beginning with the top row of the even field.

Where "err_interleave"=1, error correction values are stored in frame format in error memory 210 but are to be loaded and stored in a field order, the arrangement of the intermediate predicted components, in the data cache of the mixer unit 208. Thus rows of even fields and rows of odd fields are loaded from the frame arrangement and stored separately in the mixer unit 208.

Where "err_interleave"=0, the arrangement of the error correction values matches the arrangement of the intermediate predicted components so error correction values are loaded as either frames or fields depending on their arrangement in error memory 210 and stored in the same arrangement in mixer unit 208. Thereafter the error correction values are arranged in the same manner as the intermediate predicted components.

In 705, mixer 208 adds each of the four intermediate predicted components, variable "Out_n", to an associated error correction value to produce predicted components, variable "Fin_n", where n is 0, 1, 2, or 3. However, where the associated error correction value is 0, no addition takes place. In another embodiment, mixer 208 adds the error correction value of zero.

In an embodiment, for intra-coded macroblocks, the reference regions are zero and the error correction values represent the predicted component.

In 706, mixer 208 adjusts predicted components, variable "Fin_n", where necessary to keep the predicted components within a range specified by MPEG (so called "saturating arithmetic"). The following pseudocode illustrates the operation by mixer 208 for each value of Fin_n:

if Fin_n<0, then Fin_n=0,
elseif Fin_n>255 then Fin_n=255.

In the example discussed earlier with respect to FIG. 8, the predicted components calculated for the example four sets of components (804, 806, 808, and 810 of FIG. 8), correspond to positions similar to Y0, Y1, Y2, and Y3 of FIG. 8 in a predicted component matrix.

In 707, mixer unit 208 stores the predicted components in result memory 212, with the beginning address specified by "result_addr". The arrangement in which the predicted components are stored in result memory 212 is specified by parameter "result_interleave".

In this embodiment, where "result_interleave"=0, predicted components are stored as they are arranged, i.e., frame or field, into result memory 212.

Where "result_interleave"=1, predicted components are in a field arrangement, but are to be stored in frame arrangement in result memory 212. In such case, a first execution of instruction predict stores rows from the even field into every even line of result memory 212. A next execution of instruction predict stores rows from the odd field into every odd line of result memory 212. Thereby, fields are stored in frame order.

Where "result_interleave"=2, predicted components are in a frame order but are stored in a field arrangement in result memory 212.

Instruction Store

Referring to FIG. 3A, next motion compensation unit 200 executes instruction store 304. Instruction store directs memory unit 202 to load predicted components from result memory 212 beginning with an address specified by parameter "result_addr" and store the predicted components in main memory 216 in an address specified by parameter "store_mem_addr". Parameter "store_rows" specifies a number of 16 byte data units that are written to main memory 216 in an execution of instruction store.

Conclusion

The above-described embodiments of the present invention are merely meant to be illustrative and not limiting. It will thus be obvious to those skilled in the art that various changes and modifications may be made without departing from this invention in its broader aspects. For example, embodiments of the present invention could be applied to the H.263 or MPEG-4 coding standards. Therefore, the appended claims encompass all such changes and modifications as fall within the true scope of this invention.

Appendix A

A conventional 3-D graphics texture mapping process includes acts named as "application", "transformation", "lighting", "clipping", "setup", and "rasterization". The acts are described in more detail below.

"Application" is a code segment, written for example in an x86 compatible language, that specifies what objects are shaped like, what textures are to be applied to the objects, how many and where various light sources are, and where the "camera" eyepoint is in the scene. All the data structures and texture maps that are needed for the scene are passed onto a 3D library via an Application Program Interface (API), such as OpenGL or Direct 3D.

"Transformation" takes a point in an abstract 3D space and rotates, scales, and translates the point into a "world space."

"Lighting" involves calculating the contribution from various light sources onto the point in 3D world space.

"Clipping" discards any triangles that are off a viewable screen, and removes pieces of triangles that across the screen edge boundary.

"Setup" takes vertex information and determines information such as the slopes of the triangle edges and the gradients of various quantities being interpolated over the surface of the triangle.

"Rasterization" uses the calculated parameters to interpolate the vertex data over the surface of the triangle and deposits the pixels contained by the triangle into a frame buffer. Rasterization can be summarized in the following four acts. First, using the vertices, a rasterization engine steps through each pixel in the polygon. Also, the color information for each pixel is determined by interpolating the color information of the vertices.

Second, the color information for each pixel can include a set of texture coordinates. These coordinates are used to lookup "texels" from the texture. High-quality texturing modes, such as trilinear filtering, require multiple texels to be looked-up and filtered down into a final texel. In conventional 3D hardware engines, it is common to have a texture cache and support for trilinear filtering in order to quickly produce high-quality texturing.

Third, the mixing process uses the color information associated with the pixel, along with any texels that are associated with the pixel in order to produce a final color for the pixel. Multitexture mode allows more than one texture to be associated with a polygon, in which case there would be more than one texel.

Fourth, this final pixel color can be placed into the appropriate coordinates of the frame buffer. The frame buffer is an area of memory that holds information to produce a screen image. One complication occurs when the frame buffer already has a color value at the specific coordinates of the pixel; this requires the introduction of Z-buffering and alpha blending. Z-buffering and alpha blending will decide how the new pixel color will be combined with the old frame buffer pixel color to produce a new frame buffer pixel color.

A z-buffer is a memory buffer that holds the Z (depth) information per pixel. The Z axis is perpendicular to the X and Y axis of the screen. Depth comparison between pixels of two polygons can be used to determine occulting relationships, and only draw the nearer polygon for each pixel.

Alpha blending involves using the alpha component (which is part of the final pixel color) to proportionally weight the intensity of an object in the summation of all objects within a pixel. Alpha is commonly known as the transparency of an object or pixel.

Figure 2B:
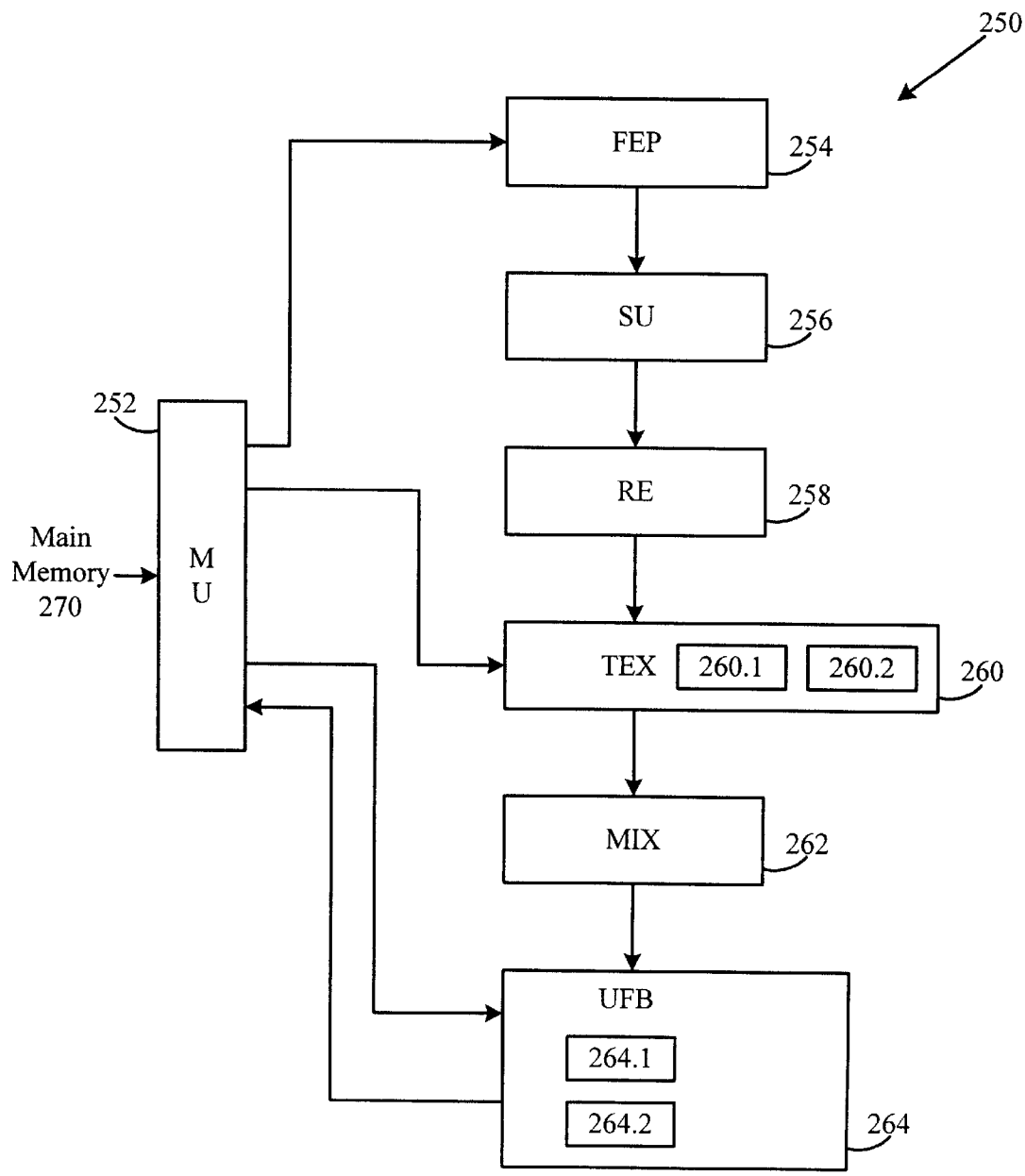
FIG. 2B depicts a conventional texture mapper used in an embodiment of the present invention.

"Setup" and "rasterization" of the conventional 3-D graphics texture mapping process use a conventional texture mapper 250, depicted schematically in FIG. 2B.

The MU 252 serves as the 3D engines interface to main memory 270. All memory requests go to the MU 252, and data returns through the MU 252 to the appropriate unit.

The FEP 254, front-end processor, fetches commands and triangle data from main memory 270. Commands are passed to other devices, and the devices react as commanded. Triangle commands require the fetching of triangle data, which is then passed to SU 256 for processing.

The SU 256, setup unit, performs the setup process, defined earlier. The SU 256 preprocesses the triangle data for easier consumption by RE 258.

The RE 258, rasterization engine, steps through the pixels in the triangle and interpolates the color information at each pixel.

The TEX 260, texturing unit, retrieves the texels from main memory 270 and filters them appropriately. The TEX 260 includes a texture cache 260.1, which allows for easy access to texels. After the texels are retrieved from the texture cache 260.1, they are combined using the current filtering mode (the filtering mode is set by a specific command).

The MIX unit 262 combines the color information and the final filtered down texel(s) to produce the final color.

The UFB 264, micro-frame buffer, takes the pixel coordinates and the final color, and updates the frame buffer based on the previous color value at those coordinates. When all the triangles that are relevant to this frame buffer have been processed, the contents of the frame buffer is written to main memory 270.

In this particular example, the z-data is stored in a Z-buffer 264.1. When a new pixel is received, its z-value is compared to the old z-value already in the z-buffer 264.1 at the same coordinates. If the new z-value is smaller than the old z-value, then the new pixel is closer than the old pixel. Based on the alpha-value of the new pixel, the new pixel color may entirely replace the old pixel color in the RGBA frame buffer 264.2, or it may be combined with the old pixel color (alpha blending). If the new z-value is larger than the old z-value, then the old pixel is closer than the new pixel. Based on the alpha-value of the old pixel color, the pixel color in the RGBA frame buffer 264.2 may remain unchanged, or it may be combined with the new pixel color.

The following table represents elements of the motion compensation unit 200 that use elements of conventional texture mapper 250, in accordance with one embodiment of the present invention.

| motion compensation unit 200 | texture mapper 250 |
|---|---|
| memory unit 202 | MU 252 |
| command unit 220 | FEP 254 |
| reference memory 204 | texture cache 260.1 |
| reference filter 206 | texture filter 260.2 |
| mixer 208 | UFB 264 |
| result memory 212 | RGBA frame buffer 264.2 |
| error memory 210 | Z-buffer memory 264.1 |

What is claimed is:

1. A computer system that performs motion compensation, the computer system comprising:
   a storage device;
   a memory unit that loads at least one error correction value and at least one reference component into the storage device; and
   a calculation unit operative to receive the at least one reference component and the at least one error correction value from the storage device, wherein the calculation unit determines multiple predicted components in parallel with the loading of the at least one reference component; and wherein the calculation unit stores the multiple predicted components into the storage device.

2. The computer system of claim 1, wherein the storage device comprises a reference memory, an error memory, and a result memory.

3. The computer system of claim 1, wherein the calculation unit comprises a reference filter and a mixer device, wherein the reference filter calculates intermediate predicted components from the reference components and provides the intermediate predicted components to the mixer device, and wherein the mixer device performs error correction on the intermediate predicted components to generate predicted components and stores the predicted components into the storage device.

4. The computer system of claim 1, wherein for each of the at least one reference component, the memory unit retrieves distinct left and right portions.

5. A computer system that performs motion compensation, comprising:

a storage device;

a memory unit that loads at least one error correction value and at least one reference component into the storage device; and a calculation unit, including a reference filter and a mixing unit, operative to receive the at least one reference component and the at least one error correction value from the storage device, the reference filter calculates intermediate predicted components from the reference components and provides the intermediate predicted components to the mixer device, the mixer device performs error correction on the intermediate predicted components to generate predicted components, wherein the calculation unit determines multiple predicted components in parallel and stores the multiple predicted components in the storage device.

6. The system of claim 5, wherein the storage device comprises a reference memory, an error memory and a result memory.

7. The system of claim 5, wherein for each of the at least one reference component, the memory unit retrieves distinct left and right portions thereof.

8. A method for providing motion compensation, the method comprising the acts of:

retrieving a left portion of a component of a first reference pixel group;

retrieving a right portion of the component of the first reference pixel group;

retrieving a left portion of a component of a second reference pixel group;

retrieving a right portion of the component of the second reference pixel group;

computing multiple intermediate predicted components from components of the first and second reference groups;

a method of loading data in a first arrangement and storing the data in a second arrangement, wherein the first and second arrangements are different, comprising the acts of:

loading the data, the data being in a first arrangement; determining an arrangement to store the data; and selectively storing the data in a second arrangement.

9. The method of claim 8 wherein the first reference pixel group comprises a forward reference pixel group.

10. The method of claim 8 wherein the second reference pixel group comprises a backwards reference pixel group.

11. The method of claim 8 wherein the component of a first reference pixel group is stored in a memory having a column width of 8 bytes.

12. The method of claim 8 wherein the component of a first reference pixel group is stored in a memory having a column width of 16 bytes.

13. The method of claim 8 wherein the component of a second reference pixel group is stored in a memory having a column width of 8 bytes.

14. The method of claim 8 wherein the component of a second reference pixel group is stored in a memory having a column width of 16 bytes.

15. A method of loading data in a first arrangement and storing the data in a second arrangement, wherein the first and second arrangements are different, comprising the acts of:

loading the data, the data being in a first arrangement, such that the first arrangement is at least one of: a field type and a frame type;

determining an arrangement to store the data;

selectively storing the data in the second arrangement, wherein the second arrangement is the field type if the first arrangement is the frame type and the second arrangement is the frame type if the first arrangement is the field type;

a computer system that loads data in a first arrangement and stores the data in a second arrangement, the computer system comprising:

a storage device;

a memory unit which loads the data from the storage device, the data being in a first arrangement;

a second storage device;

a circuit, which according to an interleave code, selectively stores the data in the second storage device in a second arrangement, wherein the first and second arrangements are different;

wherein the first arrangement is a field type and the second arrangement is a frame type; and wherein the first arrangement is a frame type and the second arrangement is a field type.

16. The method of claim 15 wherein the storing further includes the act of:

storing even lines of the data.

17. The method of claim 15 wherein the storing further includes the act of:

storing odd lines of the data.

18. A computer system that loads data in a first arrangement and stores the data in a second arrangement, the computer system comprising:

a storage device;

a memory unit which loads the data from the storage device, the data being in a first arrangement, such that the first arrangement is at least one of: a field type and a frame type;

a second storage device;

a circuit, which according to an interleave code, selectively stores the data in the second storage device in a second arrangement, wherein the second arrangement is the field type if the first arrangement is the frame type and the second arrangement is the frame type if the first arrangement is the field type.

19. The computer system of claim 18 wherein the circuit further includes:

a second circuit which stores even lines of the data.

20. The computer system of claim 18 wherein the circuit further includes:

a second circuit which stores odd lines of the data.

* * * * *